United States Patent
Eguchi

(10) Patent No.: US 7,450,257 B2
(45) Date of Patent: Nov. 11, 2008

(54) FACSIMILE MACHINE WITH FORWARDING FUNCTION

(75) Inventor: Masashi Eguchi, Joyo (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 1017 days.

(21) Appl. No.: 10/322,398

(22) Filed: Dec. 17, 2002

(65) Prior Publication Data

US 2003/0117667 A1    Jun. 26, 2003

(30) Foreign Application Priority Data

Dec. 20, 2001    (JP)    ............... 2001-388261

(51) Int. Cl.
*G06K 1/00*    (2006.01)
*H04N 1/00*    (2006.01)

(52) U.S. Cl. .............. 358/1.15; 358/407; 358/402; 358/403

(58) Field of Classification Search ............... 358/1.15, 358/407, 402, 403, 434; 370/235, 237, 351, 370/382; 379/383, 428, 211.02, 221.14

See application file for complete search history.

(56) References Cited

U.S. PATENT DOCUMENTS

| | | | | |
|---|---|---|---|---|
| 6,058,169 A | * | 5/2000 | Bramnick et al. | 379/100.01 |
| 6,088,127 A | * | 7/2000 | Pieterse | 358/407 |
| 6,101,244 A | * | 8/2000 | Okada | 379/100.08 |
| 6,104,500 A | * | 8/2000 | Alam et al. | 358/1.15 |
| 7,068,384 B1 | * | 6/2006 | Hou | 358/1.15 |
| 2002/0126321 A1 | * | 9/2002 | Trachtman | 358/407 |

FOREIGN PATENT DOCUMENTS

| | | |
|---|---|---|
| JP | 04-000855 | 1/1992 |
| JP | 09-046330 | 2/1997 |
| JP | 10-240639 | 9/1998 |
| JP | 11-187066 | 7/1999 |
| JP | 2001-345836 | 12/2001 |

\* cited by examiner

*Primary Examiner*—Houshang Safaipour
(74) *Attorney, Agent, or Firm*—Hogan & Hartson LLP

(57) ABSTRACT

A facsimile machine includes a receiver receiving image data, a first setting device setting a forwarding destination to some of the image data received by the receiver and a first transmitter transmitting the image data to the forward destination set by the first setting device. The facsimile machine also includes a second transmitter transmitting the image data not set with the forwarding destination by the first setting device to a prescribed forwarding destination.

21 Claims, 8 Drawing Sheets

| CONDITION | FORWARDING DESTINATION |
|---|---|
| To :0312345678 | 0387654321 |
| From:abc@defg.co.jp | xyz@opq.com |
| From:0757891234 | 0667891234 |
| Subject:memo | lmn@abc.com |
| ⋮ | ⋮ |

| CONDITION | FORWARDING DESTINATION |
|---|---|
| To :0312345678 | 0387654321 |
| From:abc@defg.co.jp | xyz@opq.com |
| From:0757891234 | 0667891234 |
| Subject:memo | lmn@abc.com |
| ⋮ | ⋮ |

FACSIMILE MACHINE WITH FORWARDING FUNCTION

FIELD OF THE INVENTION

The present invention relates to a facsimile machine that carries out transmission and reception of image data with another communication device via a public telephone line or the Internet.

DESCRIPTION OF THE RELATED ART

A facsimile machine carries out transmission and reception of image data with another facsimile machine via a public telephone line. The facsimile machine also carries out transmission and reception of image data as an attached file of an electronic mail with another facsimile machine via the Internet. The facsimile machine prints out the received image data on a recording paper by a printing unit provided within the facsimile machine. However, the recording paper printed with the received image data is left on the facsimile machine's tray until a recipient obtains the paper. Therefore, there is a possibility for the printed recording paper to be lost, or to be obtained by a third party.

In addition, some facsimile machines include a forwarding function. The forwarding function is a function for transmitting the image data received by the facsimile machine to a forwarding destination corresponding to reception information relating to the image data, by a recipient setting the forwarding destination corresponding to each reception information relating to the received image data, for example, information of a sender, a recipient, a title or the like. By using the forwarding function, the recipient can receive the image data reliably at a desired forwarding destination.

When receiving image data, the facsimile machine having the above-mentioned forwarding function determines whether or not a forwarding destination corresponding to the reception information relating to the received image data is set. When the forwarding destination is set, the received image data is transmitted to the forwarding destination. When the forwarding destination is not set, the image data is printed on a recording paper. However, even for the image data that is to be printed on the recording paper, there are cases when the user wishes to forward the received image data temporarily at a requested time, such as during the nighttime or a holiday when workers are absent from the office. Even when carrying out the temporary forward processing in these cases, the above-mentioned facsimile machine is required to deal with resetting of the forwarding destination, etc. Thus, there was a problem in that the processing is complicated.

SUMMARY OF THE INVENTION

The present invention was made in consideration to the above-mentioned problem. An advantage of the present invention is to provide a facsimile machine that has image data received reliably at a desired forwarding destination by transmitting the image data temporarily to a prescribed forwarding destination even when the image data is set to be printed on a recording paper.

Another advantage of the present invention is to provide a facsimile machine that can have the image data received at a desired time, such as nighttime or a holiday, to be received reliably at a prescribed forwarding destination. This can be realized by the facsimile machine transmitting the image data to a prescribed forwarding destination temporarily in the case a time range when an image data should be transmitted to a prescribed destination is set, and the reception time of the image data not set with a corresponding forwarding destination is within the time range.

Furthermore, another advantage of the present invention is to provide a facsimile machine that can receive an image data reliably at the facsimile machine itself. This can be realized by the facsimile machine printing out the image data on a recording paper, when a reception time of the image data not set with a corresponding forwarding destination is not within a time range set to transmit the image data to a prescribed forwarding destination.

According to a first aspect of the present invention, a facsimile machine includes a receiver receiving image data. In addition, the facsimile machine includes a first setting device setting a forwarding destination to some of the image data received by the receiver. The facsimile machine also includes a first transmitter transmitting the image data to the forwarding destination set by the first setting device. In addition, the facsimile machine includes a second transmitter transmitting to a prescribed forwarding destination, an image data that was not set with the forwarding destination by the first setting device.

According to the first aspect of the present invention, the received image data is transmitted to the forwarding destination corresponding to the image data, or when the corresponding forwarding destination is not set, in other words, when the image data is required to be printed on a recording paper, the image data is transmitted to a prescribed forwarding destination. As a result, the recording paper printed with the received image data is not left, and the image data can be received reliably at a desired forwarding destination.

According to a second aspect of the present invention, the facsimile machine according to the first aspect includes a second setting device that sets a time range when the second transmitter should transmit the image data to the prescribed forwarding destination. In addition, the facsimile machine includes a clock indicating the time when the receiver received the image data. The facsimile machine also includes a controller that determines whether or not the time indicated by the clock is within the time range set by the second setting device. The second transmitter transmits the image data to the prescribed forwarding destination when the controller determines that the time indicated by the clock is within the time range set by the second setting device.

According to the second aspect of the present invention, in case the time range when the image data should be transmitted to the prescribed forwarding destination is set, and the reception time of the image data that is not set with a corresponding forwarding destination is within the time range, the image data is transmitted to the prescribed forwarding destination temporarily. As a result, the facsimile machine can have the image data received during a desired time such as nighttime or a holiday to be received reliably at the prescribed forwarding destination.

According to a third aspect of the present invention, the facsimile machine according to the second aspect includes a printer printing the image data on a recording paper, when the controller determines that the reception time of the image data is not within the set time range.

According to the third aspect of the present invention, in the case the reception time of the image data not set with the corresponding forwarding destination is not within a time range set for the image data to be transmitted to the prescribed forwarding destination, the image data is printed on the recording paper. As a result, the facsimile machine itself can reliably receive the image data that is not required to be forwarded.

DETAILED DESCRIPTION OF THE PREFERRED EMBODIMENTS

The embodiments of the present invention will be described in accordance with the drawings.

First Embodiment

Figure 1:
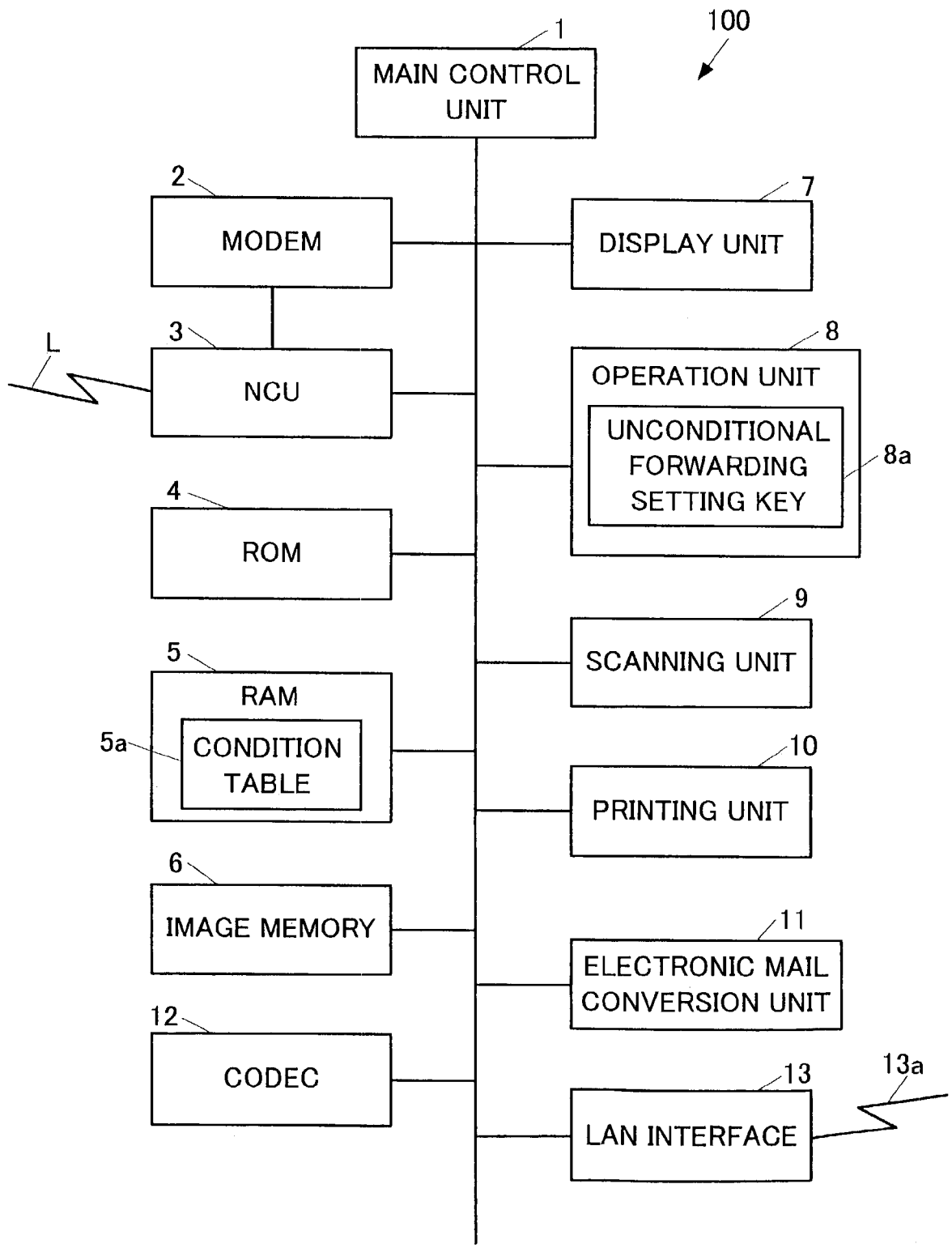
FIG. 1 is a block diagram showing a configuration of a facsimile machine according to a first embodiment of the present invention.
Figures 2, 3:
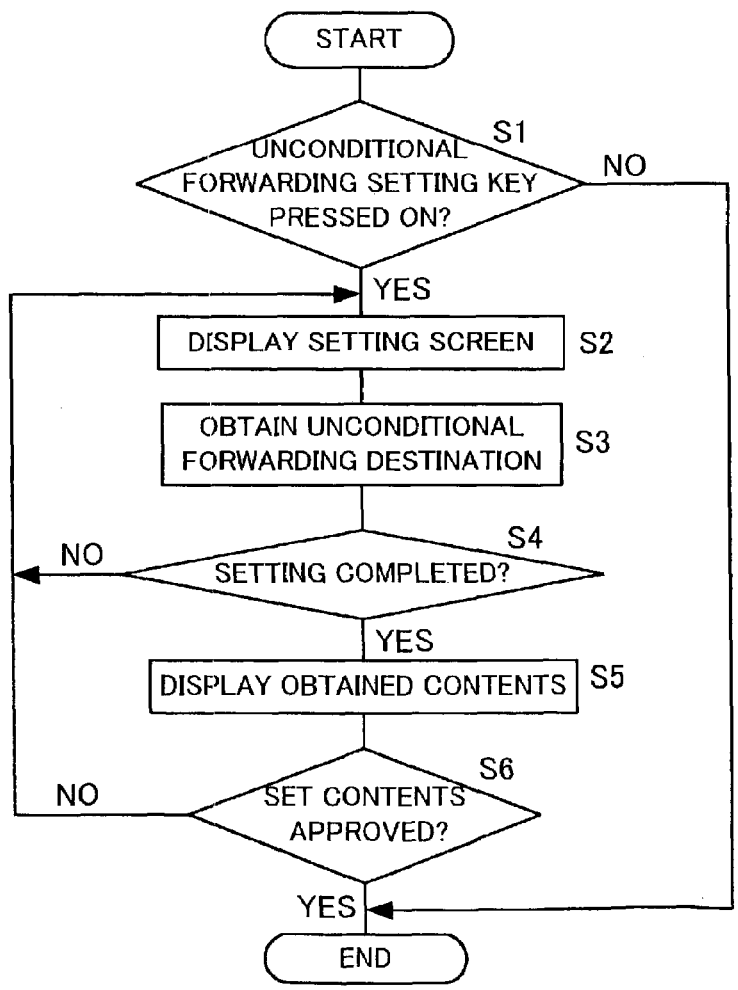
FIG. 2 is a view showing an example of a condition table.
FIG. 3 is a flowchart showing unconditional forwarding setting process procedure according to the first embodiment.

FIG. 1 is a block diagram showing a configuration of a facsimile machine 100 according to a first embodiment. FIG. 2 is a view showing an example of a condition table. The facsimile machine 100 includes a forwarding function and an unconditional forwarding function. When receiving image data, the facsimile machine 100 transmits the image data by the forwarding function to a forwarding destination set in accordance with a condition relating to the reception of the image data, for example, condition of a sender, a recipient, a title or the like. When receiving the image data not set with the forwarding destination according to the condition, the facsimile machine 100 transmits the image data by the unconditional forwarding function to a prescribed forwarding destination.

The facsimile machine 100 includes a main control unit 1, a modem 2, NCU (Network Control Unit) 3, ROM (Read Only Memory) 4, RAM (Random Access Memory) 5, an image memory 6, a display unit 7, an operation unit 8, a scanning unit 9, a printing unit 10, an electronic mail conversion unit 11, a codec 12, LAN (Local Area Network) interface 13 and the like.

The main control unit 1 is formed from a CPU (Central Processing Unit) specifically. The main control unit 1 is connected to each of the hardware units mentioned above of the facsimile machine 100 via a bus. In addition, the main control unit 1 controls each of the hardware units, and in accordance with a computer program stored in the ROM 4, executes various software functions.

The modem 2 is formed from a faxmodem that can carry out a facsimile communication. The modem 2 is connected directly to the NCU 3.

The NCU 3 is connected to a public telephone line L. When necessary, the NCU 3 connects the modem 2 and the public telephone line L, and carries out G3 facsimile communications with another communication device via the public telephone line L.

The ROM 4 stores in advance various software programs that are necessary for the operation of the facsimile machine 100.

The image memory 6 is formed from DRAM (Dynamic Random Access Memory) or the like. The image memory 6 stores the image data scanned by the scanning unit 9 that is required to be transmitted. In addition, the image memory 6 stores the image data received via LAN (Local Area Network) 13a and the public telephone line L.

The RAM 5 is formed from SRAM (Static Random Access Memory), a flash memory or the like. The RAM 5 stores temporally data that is generated when the software is executed. Further, when the flash memory is used for the RAM 5, even when the power source is shut due to a blackout or transferring of the facsimile machine 100, the stored contents are not lost. In addition, the RAM 5 stores user names and passwords that are necessary for receiving an electronic mail, and a condition table 5a as shown in FIG. 2 that is set by the user, and corresponds to each forwarding destination to the reception condition relating to the received image data, for example, condition of the sender, the recipient, the title and the like. Furthermore, the RAM 5 stores the unconditional forwarding destinations that receive the forwarding of the image data not set with corresponding forwarding destination in the conditional table 5a.

The display unit 7 is a displaying device such as LCD (Liquid Crystal Display), CRT (Cathode Ray Tube) display or the like. The display unit 7 displays an operation status of the facsimile machine 100, and also displays the image data of an original that is scanned for transmission or the received image data, and usage status of the communication or the like.

The operation unit 8 includes letter keys, ten-key numeric pad, speed-dial keys, one-touch dial keys, various function keys and the like that are necessary for operating the facsimile machine 100. The function keys include unconditional forwarding setting key 8a for setting whether or not to carry out unconditional forwarding. Further, in the unconditional forwarding, the image data not set with a corresponding forwarding destination in the condition table 5a is transmitted to a prescribed unconditional forwarding destination stored in the RAM 5. Moreover, by forming the display unit 7 as a touch panel, a part or all of the various keys within the operation unit 8 can be shared.

The scanning unit 9 scans an original by CCD (Charge Coupled Device) or the like, and stores the scanned image data in the image memory 6.

The printing unit 10 is an electro-photographic printing device. The printing unit 10 prints the received image data and the image data of the original scanned by the scanning unit 9 as a hard copy, after selecting the recording paper in most suitable size from the recording papers of each size such as A3, B4, A4, B5 and A5.

The electronic mail conversion unit 11 converts the image data scanned by the scanning unit 9 and encoded by the codec 12 into an electronic mail format, and also carries out reverse conversion, from electronic mail format into the image data.

The codec 12 encodes the image data scanned by the scanning unit 9 to be transmitted. In addition, the codec 12 decodes the image data received from the outside and converted by the electronic mail conversion unit 11.

The LAN interface 13 is an interface for connecting the facsimile machine 100 and the LAN 13a. The LAN interface 13 carries out transmission and reception of the electronic mail with another communication device via the LAN 13a.

Next, the setting process of the unconditional forwarding of the facsimile machine 100 having the above-mentioned configuration will be described.

FIG. 3 is a flowchart showing the unconditional forwarding setting process procedure of the facsimile machine 100 according to the first embodiment. The main control unit 1 provided in the facsimile machine 100 of the present invention determines whether or not the unconditional forwarding setting key 8*a* in the operation unit 8 is pressed on (S1). When the main control unit 1 determines that the unconditional forwarding setting key 8*a* is pressed on, a setting screen for setting the forwarding destination of the unconditional forwarding is displayed on the display unit 7 (S2).

In accordance with the setting screen displayed on the display unit 7, the user operates the operation unit 8 to input the unconditional forwarding destination. The main control unit 1 obtains the input unconditional forwarding destination (S3). Then, the input unconditional forwarding destination is stored in the RAM 5, and the completion of the setting from the user is waited (S4). When the user finishes the setting of the unconditional forwarding destination, the main control unit 1 displays the unconditional forwarding destination which is the obtained contents on the display unit 7 (S5). Then, approval of the set contents from the user is waited (S6). When the user approves the set contents, the main control unit 1 ends the setting processing. Meanwhile, when the user does not approve the set contents ("NO" in S6), the main control unit 1 displays the setting screen on the display unit 7 such that the unconditional forwarding destination is set again (S2).

As described above, by setting the unconditional forwarding destination, when receiving the image data or the electronic mail not set with corresponding forwarding destination in the condition table 5*a*, the facsimile machine 100 transmits the image data or the electronic mail to the unconditional forwarding destination. As a result, the recipient can receive the image data or the electronic mail at the unconditional forwarding destination.

Figure 4:
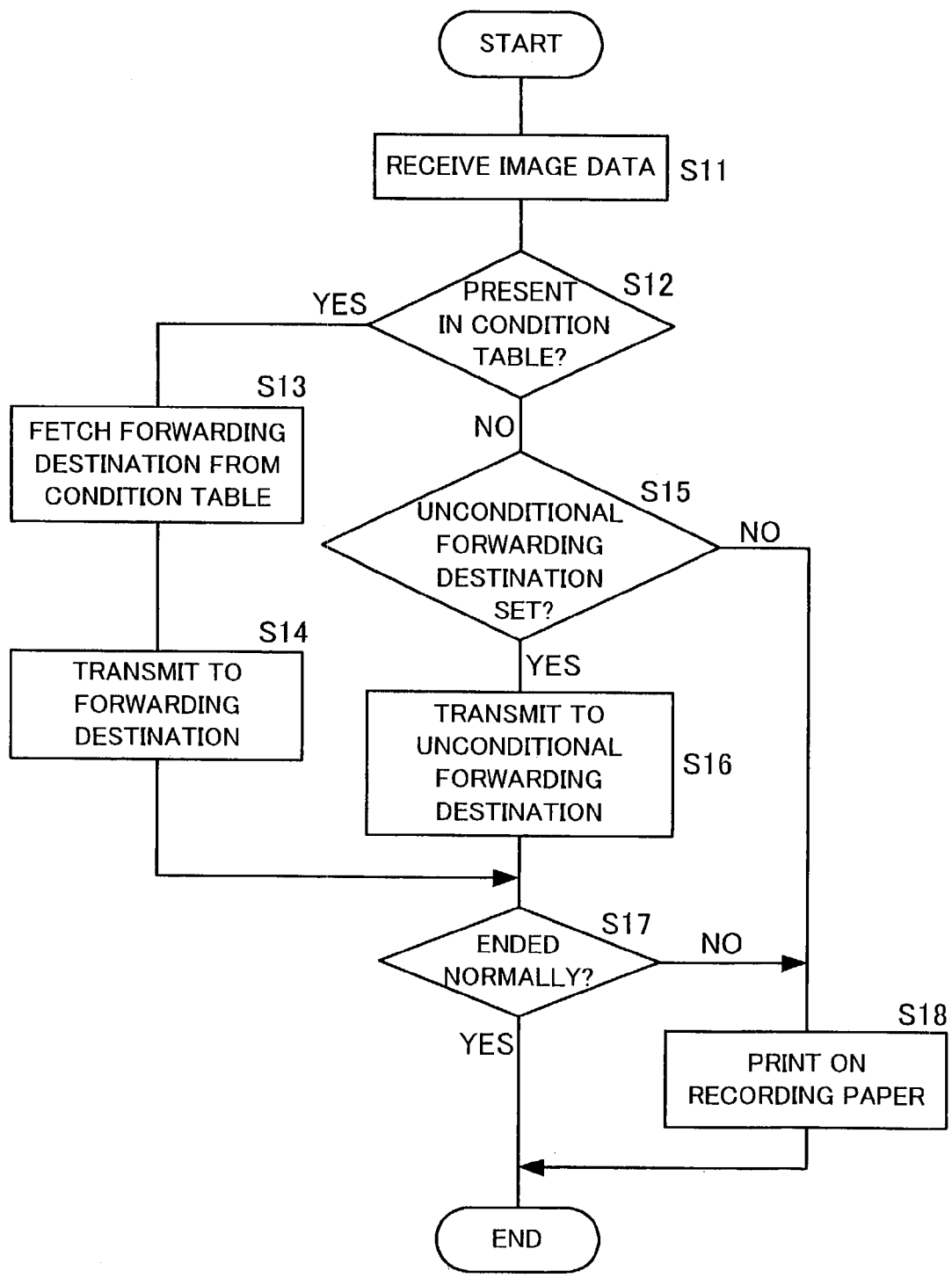
FIG. 4 is a flowchart showing facsimile reception processing and forward processing procedures of the facsimile machine according to the first embodiment.

Next, the reception processing of the image data and the forward processing of the received image data in the facsimile communication by the facsimile machine 100 according to the first embodiment will be described. FIG. 4 is a flowchart showing the facsimile reception processing and forward processing procedures of the facsimile machine 100 according to the first embodiment.

When receiving the image data by the G3 facsimile communication via the public telephone line L (S11), the main control unit 1 determines whether or not the condition obtained from a facsimile communication procedure signal, for example, the condition of the sender, the recipient, the title or the like is present in the condition table 5*a* stored in the RAM 5 (S12). When the condition table 5*a* includes the condition relating to the received image data, the main control unit 1 fetches the forwarding destination corresponding to the image data from the condition table 5*a* (S13). Then, the main control unit 1 transmits the image data to the fetched forwarding destination (S14).

In step S12, when the condition table 5*a* does not include the condition relating to the received image data, the main control unit 1 determines whether or not the unconditional forwarding destination is set in the RAM 5 (S15). When the main control unit 1 determines that the unconditional forwarding destination is not set, the main control unit 1 prints the received image data on a recording paper by the printing unit 10 (S18). Moreover, when the main control unit 1 determines that the unconditional forwarding destination is set, the main control unit 1 fetches the unconditional forwarding destination from the RAM 5, and transmits the received image data to the fetched unconditional forwarding destination (S16). Next, the main control unit 1 determines whether or not the forward processing has ended normally (S17). When the forward processing has ended normally, the above processing is ended. Meanwhile, when the forward processing has not ended normally, the main control unit 1 prints the received image data on the recording paper by the printing unit 10 (S18).

Figure 5:
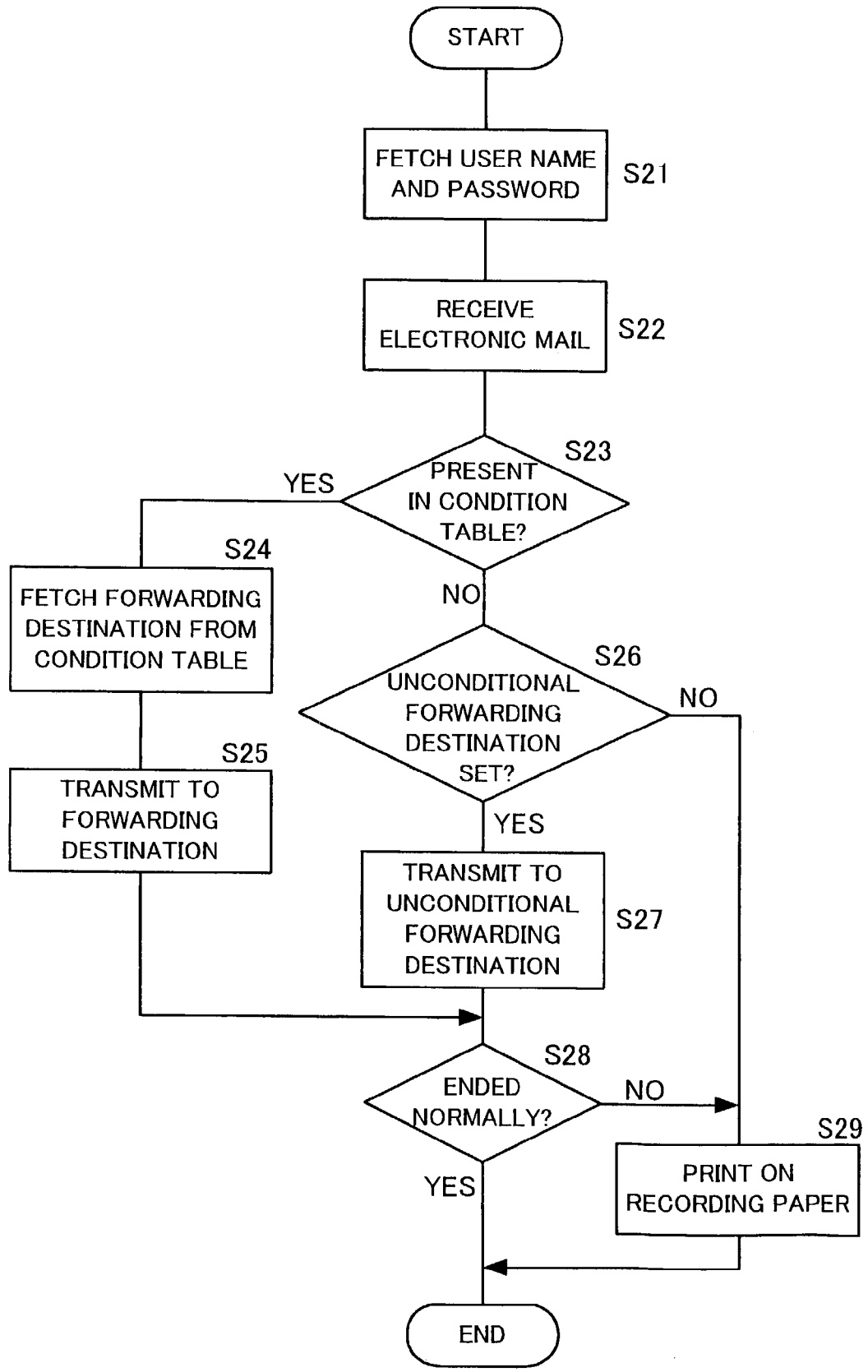
FIG. 5 is a flowchart showing electronic mail reception processing and forward processing procedures of the facsimile machine according to the first embodiment.

Next, the reception processing of the electronic mail from the mail server device, and the forward processing of the electronic mail received from the mail server device (not shown in the drawings) by the facsimile machine 100 according to the present embodiment will be described. FIG. 5 is a flowchart showing the reception processing and the forward processing procedures of the electronic mail by the facsimile machine 100 according to the first embodiment of the present invention.

When receiving the electronic mail from the mail server device via the LAN 13*a*, the main control unit 1 fetches the user name (electronic mail account) of the user who should receive the electronic mail, and the password corresponding to the user name from the RAM 5, and transmits the user name and the password to the mail server device (S21). Then, the main control unit 1 receives the electronic mail addressed to this user from the mail server device (S22).

The main control unit 1 determines whether or not the condition written in a header part of the received electronic mail or the condition obtained from the electronic mail communication procedure is included in the condition table 5*a* stored in the RAM 5 (S23). When the condition table 5*a* includes the condition relating to the received electronic mail, the main control unit 1 fetches the forwarding destination corresponding to the electronic mail from the condition table 5*a* (S24). Then, the main control unit 1 transmits the electronic mail to the fetched forwarding destination (S25).

In step S23, when the condition table 5*a* does not include the condition relating to the received electronic mail, the main control unit 1 determines whether or not the unconditional forwarding destination is set in the RAM 5 (S26). When the main control unit 1 determines that the unconditional forwarding destination is not set, the main control unit 1 converts the received electronic mail by the electronic mail conversion unit 11, decodes by the codec 12, and prints on the recording paper by the printing unit 10 (S29). Meanwhile, when the main control unit 1 determines that the unconditional forwarding destination is set, the main control unit 1 fetches the unconditional forwarding destination from the RAM 5, and transmits the received electronic mail to the fetched unconditional forwarding destination (S27). Next, the main control unit 1 determines whether or not the forward processing has ended normally (S28). When the forward processing has ended normally, the above-mentioned processing is ended. Meanwhile, when the forward processing has not ended normally, the main control unit 1 converts the received electronic mail by the electronic mail conversion unit 11, decodes by the codec 12, and prints on the recording paper by the printing unit 10 (S29).

As described above, even when the electronic mail received via the public telephone line L and the electronic mail received via the LAN 13*a* are not set with the forwarding destination in the condition table 5*a*, the electronic mail is transmitted to a prescribed unconditional forwarding destination, and the user can receive each of the image data at the unconditional forwarding destination.

Second Embodiment

Figure 6:
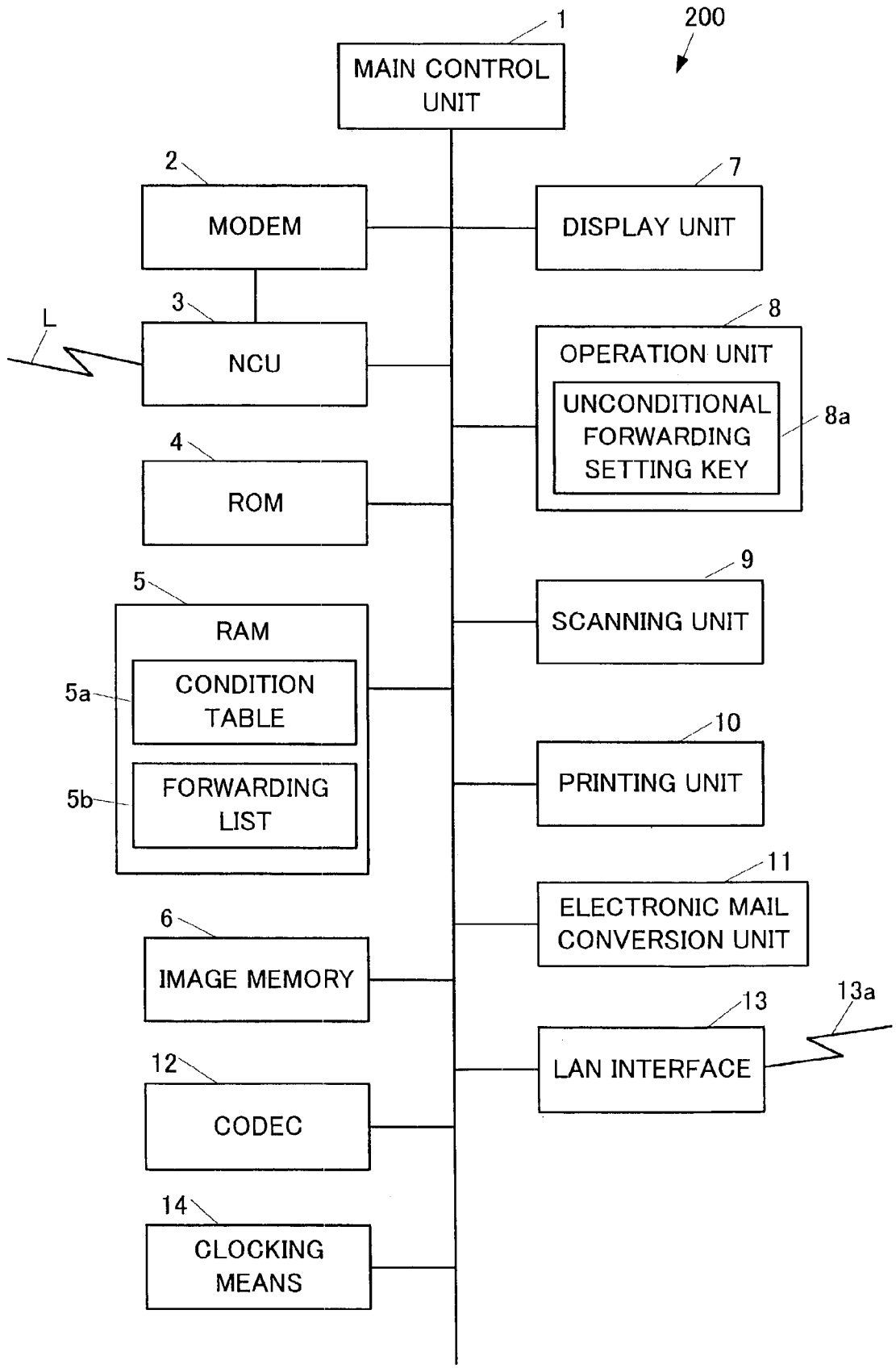
FIG. 6 is a block diagram showing a configuration of a facsimile machine according to a second embodiment.

FIG. 6 is a block diagram showing a configuration of the facsimile machine 200 according to the second embodiment. The facsimile machine 200 shown in FIG. 6 includes a main control unit 1, a modem 2, NCU 3, ROM 4, RAM 5, an image memory 6, a display unit 7, an operation unit 8, a scanning unit 9, a printing unit 10, an electronic mail conversion unit 11, a codec 12, LAN interface 13, a clocking means 14 and the like.

According to the second embodiment, the facsimile machine 200 includes the clocking means 14 to obtain the time when the image data was received via the public telephone line L, and the time when the electronic mail was received via the LAN 13a. Other parts of the configuration are the same as the facsimile machine 100 in the first embodiment. Therefore, for the same part, same reference code is applied, and the description will be abbreviated.

In addition, the RAM 5 also stores a forwarding list 5b, not only the condition table 5a. The forwarding list 5b defines the types of the electronic mail that is intended for unconditional forwarding, which is set by the user when the unconditional forwarding is set. For example, the types of the electronic mail include a delivery confirmation mail, an error notification mail, an electronic mail (Internet facsimile) from a facsimile machine having electronic mail transmitting and receiving function, or the like.

Furthermore, the unconditional forwarding setting key 8a in the operation unit 8 is a key for setting whether or not to carry out the unconditional forwarding, and also for setting the time range when the unconditional forwarding should be carried out, and setting the type of electronic mail included in the forwarding list 5b.

Figure 7:
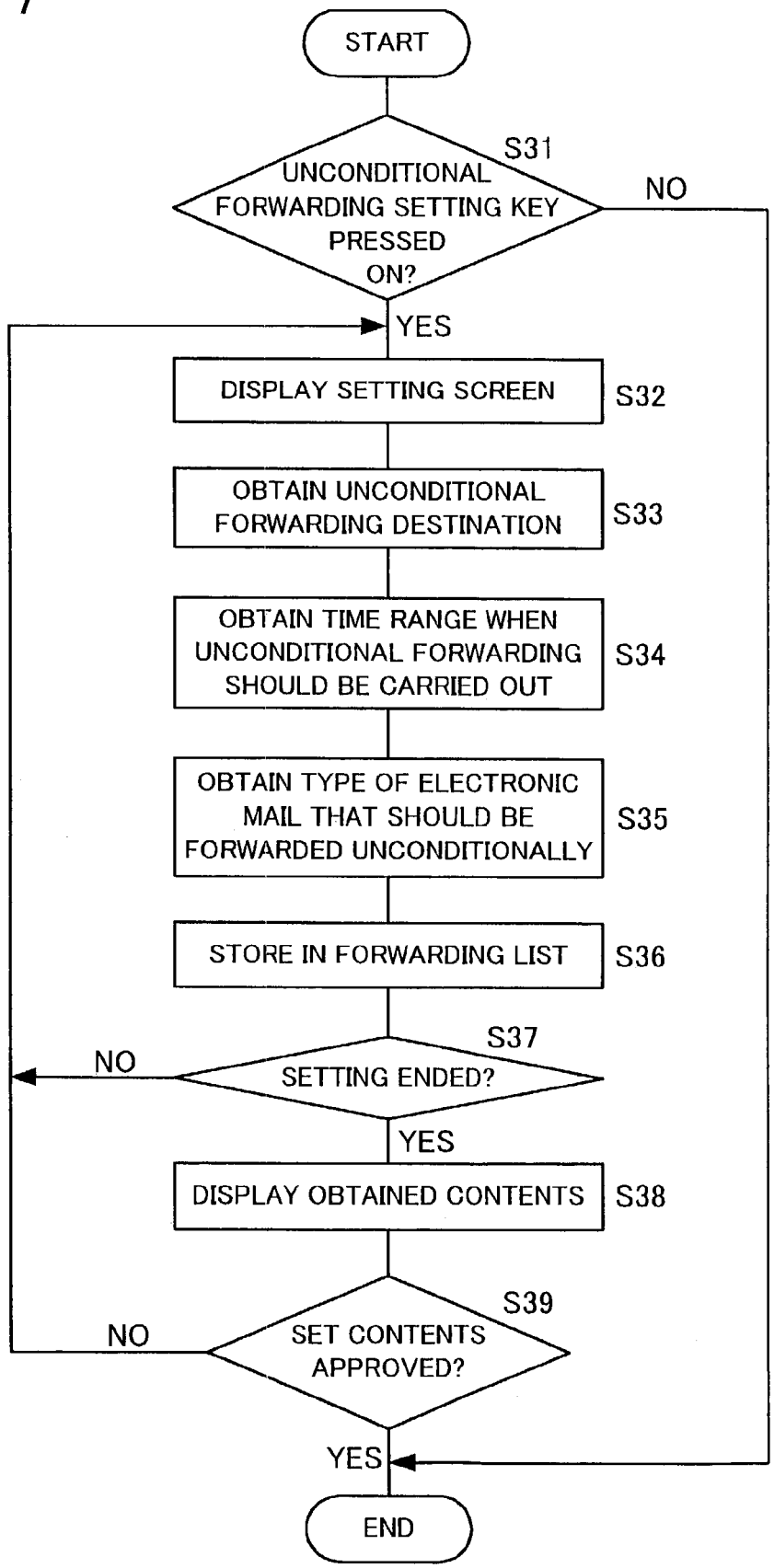
FIG. 7 is a flowchart showing unconditional forwarding setting process procedure according to the second embodiment.

Next, the setting processing of the unconditional forwarding by the facsimile machine 200 having the above-described configuration will be described. FIG. 7 is a flowchart showing the unconditional forwarding setting process procedure by the facsimile machine 200 in the second embodiment.

The main control unit 1 determines whether or not the unconditional forwarding setting key 8a in the operation unit 8 is pressed on (S31). When the main control unit 1 determines that the unconditional forwarding setting key 8a is pressed on, the setting screen for setting the forwarding destination, etc. of the unconditional forwarding is displayed on the display unit 7 (S32).

On the setting screen of the second embodiment, the time range when the unconditional forwarding should be carried out, and the types of the electronic mail included in the forwarding list 5b are also set, in addition to the unconditional forwarding destination. The user inputs the unconditional forwarding destination, the time range, and the type of the electronic mail that is included in the forwarding list 5b by operating the operation unit 8 in accordance with the setting screen.

The main control unit 1 obtains the unconditional forwarding destination input by the user (S33). The obtained unconditional forwarding destination is stored in the RAM 5, and the main control unit 1 obtains the time range when the unconditional forwarding should be carried out (S34). The obtained time range is stored in the RAM 5, and the main control unit 1 also obtains the type of the electronic mail that should be forwarded unconditionally (S35). The obtained type of the electronic mail is stored in the forwarding list 5b in the RAM 5 (S36).

Then, it is waited for the end of the setting from the user (S37). When the user ends the setting of the unconditional forwarding, the main control unit 1 displays the obtained contents on the display unit 7 (S38). Further, the obtained contents are, for example, the unconditional forwarding destination, the time range when the unconditional forwarding should be carried out, and the type of electronic mail that should be forwarded unconditionally. Then, it is waited for the approval of the set contents from the user (S39).

When the user approves the set contents, the main control unit 1 ends the setting processing. Meanwhile, when the user does not approve the set contents ("NO" in S39), the main control unit 1 displays the setting screen on the display unit 7 to set the unconditional forwarding destination again (S32).

As described above, by setting the unconditional forwarding destination, the time range when the unconditional forwarding should be carried out, and the type of electronic mail which should be forwarded unconditionally, when the facsimile machine 200 receives the image data or the electronic mail not set with corresponding forwarding destination in the condition table 5a within the time range, and when the facsimile machine 200 receives the electronic mail of the type that is included in the forwarding list 5b, the facsimile machine 200 transmits the image data or the electronic mail to the unconditional forwarding destination. The recipient can receive the image data or the electronic mail at the unconditional forwarding destination.

Figure 8:
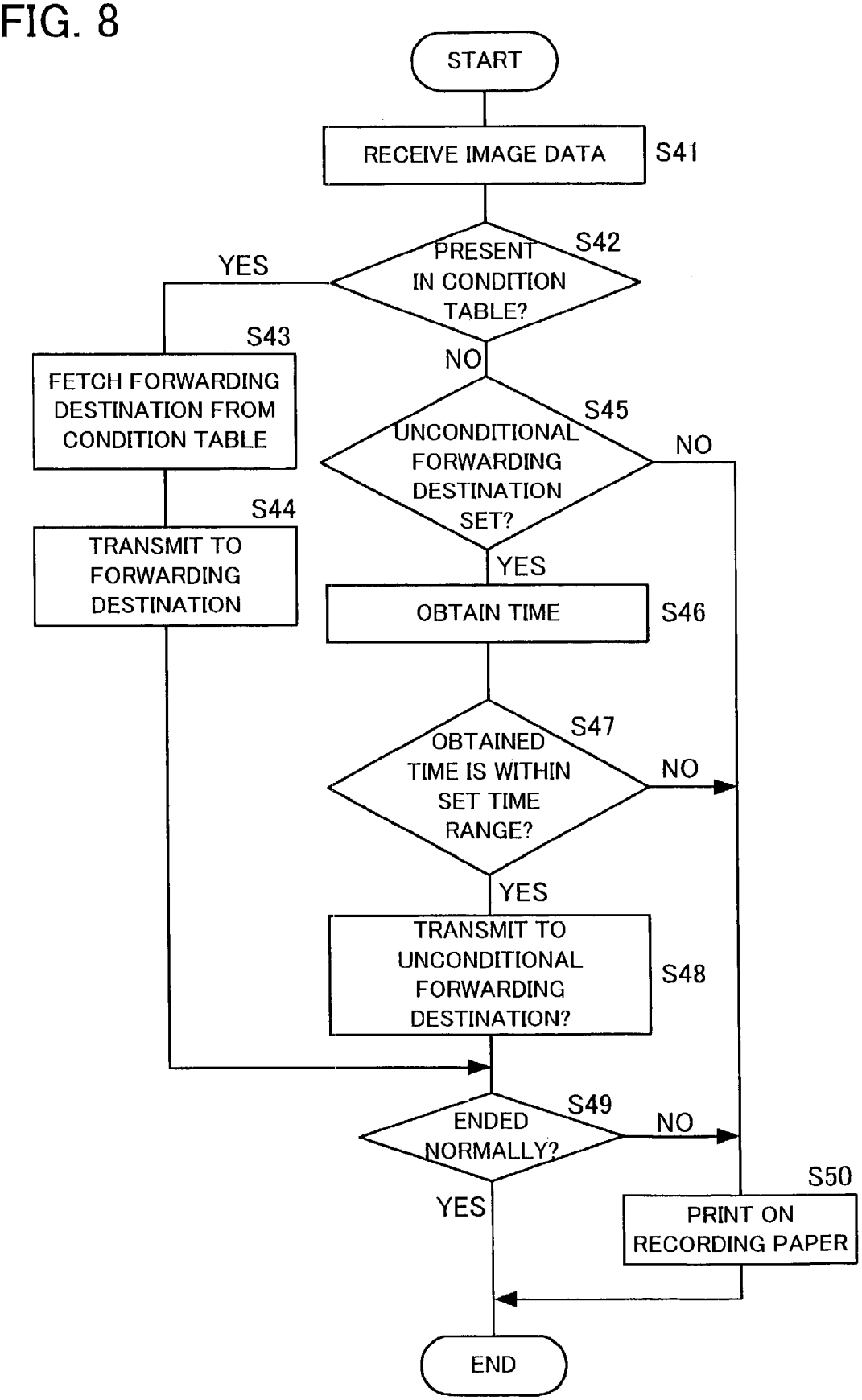
FIG. 8 is a flowchart showing facsimile reception processing and forward processing procedures of the facsimile machine according to the second embodiment.

Next, the reception processing of the image data and the forward processing of the received image data in the facsimile communication by the facsimile machine 200 according to the second embodiment will be described. FIG. 8 is a flowchart showing the facsimile reception processing and forward processing procedures of the facsimile machine 200 according to the second embodiment.

When the main control unit 1 receives the image data by the facsimile communication via the public telephone line L (S41), the main control unit 1 determines whether or not the condition obtained from the facsimile communication procedure signal is present in the condition table 5a stored in the RAM 5 (S42). When the condition relating to the received image data is present in the condition table 5a, the main control unit 1 fetches the forwarding destination corresponding to the image data from the condition table 5a (S43). Then, the main control unit 1 transmits the image data to the fetched forwarding destination (S44).

In step S42, when the condition relating to the received image data is not present in the condition table 5a, the main control unit 1 determines whether or not the unconditional forwarding destination is set in the RAM 5 (S45). When the main control unit 1 determines that the unconditional forwarding destination is not set, the main control unit 1 prints the received image data on the recording paper by the printing unit 10 (S50). When the main control unit 1 determines that the unconditional forwarding destination is set, the main control unit 1 obtains the present time from the clocking means 14 (S46). In addition, the main control unit 1 fetches from the RAM 5, the time range when the unconditional forwarding should be carried out, and determines whether or not the obtained time is within the time range (S47).

When the main control unit 1 determines that the obtained time is within the set time range, the main control unit 1 fetches the unconditional forwarding destination from the RAM 5, and transmits the received image data to the fetched unconditional forwarding destination (S48). Meanwhile, when the main control unit 1 determines that the obtained time is not within the set time range, the main control unit 1 prints the received image data on the recording paper by the printing unit 10 (S50).

Next, the main control unit 1 determines whether or not the forward processing has ended normally (S49). When the forward processing has ended normally, the above-mentioned processing is ended. When the forward processing has not ended normally, the main control unit 1 prints the received image data on the recording paper by the printing unit 10 (S50).

Figure 9:
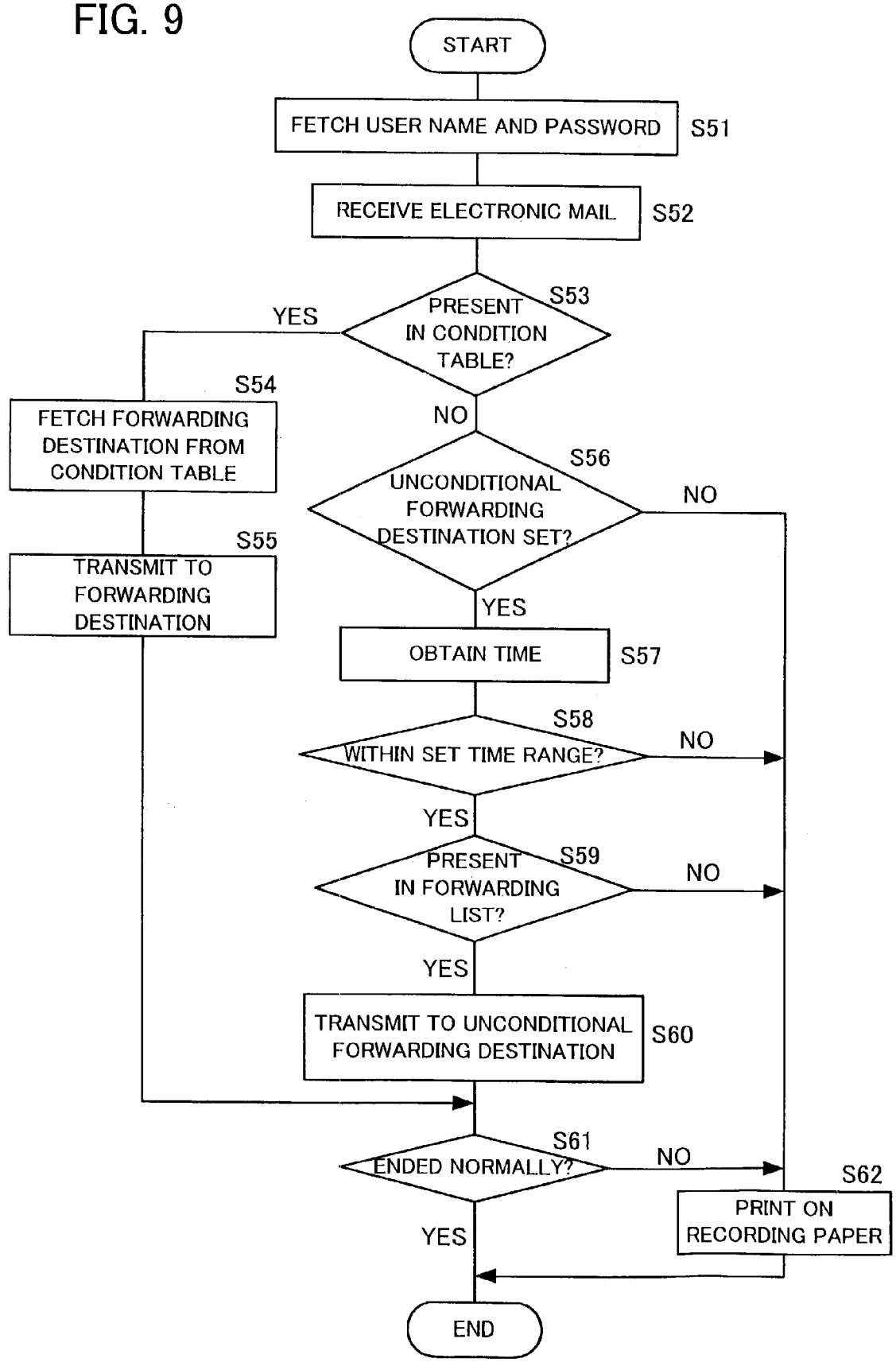
FIG. 9 is a flowchart showing electronic mail reception processing and forward processing procedures of the facsimile machine according to the second embodiment.

Next, the reception processing of the electronic mail from the mail server device and the forward processing of the received electronic mail by the facsimile machine 200 according to the second embodiment will be described. FIG. 9 is a flowchart showing the reception processing and the forward processing of the electronic mail by the facsimile machine 200 according to the second embodiment.

When the main control unit 1 receives the electronic mail from the mail server device (not shown in the drawings) via the LAN 13*a*, the main control unit 1 fetches the user name (electronic mail account) of the user who should receive the electronic mail and the password corresponding to the user from the RAM 5, and transmits the user name and the password to the mail server device (S51). Then, the main control unit 1 receives the electronic mail addressed to this user from the mail server device (S52).

The main control unit 1 determines whether or not the condition written in the header part of the received electronic mail, or the condition obtained from the electronic mail communication procedure is present in the condition table 5*a* stored in the RAM 5 (S53). When the condition relating to the received electronic mail is present in the condition table 5*a*, the main control unit 1 fetches the forwarding destination corresponding to the electronic mail from the condition table 5*a* (S54). Then, the main control unit 1 transmits the electronic mail to the fetched forwarding destination (S55).

When the condition relating to the received electronic mail is not present in the condition table 5*a* in step S53, the main control unit 1 determines whether or not the unconditional forwarding destination is set in the RAM 5 (S56). When the main control unit 1 determines that the unconditional forwarding destination is not set, the main control unit 1 converts the received electronic mail 1 by the electronic mail conversion unit 11, decodes by the codec 12, and prints on the recording paper by the printing unit 10 (S62). When the main control unit 1 determines that the unconditional forwarding destination is set, the main control unit 1 obtains the present time by the clocking means 14 (S57). In addition, the main control unit 1 fetches the time range when the unconditional forwarding should be carried out from the RAM 5, and determines whether or not the obtained time is within the time range (S58).

When the main control unit 1 determines that the obtained time is within the set time range, the main control unit 1 fetches the forwarding list 5*b* from the RAM 5, and determines whether or not the type of the received electronic mail is in the forwarding list 5*b* (S59). When the main control unit 1 determines that the type of the received electronic mail is in the forwarding list 5*b*, the main control unit 1 fetches the unconditional forwarding destination from the RAM 5, and transmits the received electronic mail to the fetched unconditional forwarding destination (S60).

Next, the main control unit 1 determines whether or not the forward processing has ended normally (S61). When the forward processing has ended normally, the above processing is ended. Meanwhile, when the forward processing has not ended normally, the main control unit 1 converts the received electronic mail by the electronic mail conversion unit 11, decodes by the codec 12, and prints on the recording paper by the printing unit 10 (S62).

Meanwhile, when the main control unit 1 determines that the time when the electronic mail was received is not within the set time range in step S58, and when the main control unit 1 determines that the type of the received electronic mail is not included in the forwarding list 5*b*, the main control unit 1 converts the electronic mail by the electronic mail conversion unit 11, decodes by the codec 12, and prints on the recording paper by the printing unit 10 (S62).

As described above, even when the image data received via the public telephone line L and the electronic mail received via the LAN 13*a* are not set with the forwarding destination in the condition table 5*a*, the image data received within a prescribed time range, and the electronic mail received within the prescribed time range that is of a type set to be forwarded unconditionally in the forwarding list 5*b* are transmitted to a prescribed unconditional forwarding destination, and can be received by the user at the unconditional forwarding destination.

In the above-described embodiment, an example in which one forwarding destination is set as the unconditional forwarding destination was shown. However, the present invention is not limited to such an example, and the unconditional forwarding destination can be set for each set time range, or can be set for each user. In addition, the type of the delivery confirmation mail of the electronic mail, the error notification mail, the electronic mail from the facsimile machine having the electronic mail transmitting and receiving function, and the like are intended for the unconditional forwarding. However, the subject of the unconditional forwarding can be set by the information relating to each image data, such as the sender, and can also be set for the image data received by the facsimile communication.

What is claimed is:

1. A facsimile machine comprising:
   means for receiving image data and reception information;
   a first means for setting a forwarding destination to some of the image data received by the means for receiving, wherein the first means for setting sets a forwarding destination when the received reception information corresponds to a condition table;
   a first means for transmitting the image data to the forwarding destination set by the first means for setting;
   a second means provided within the facsimile machine for transmitting the image data not set with the forwarding destination by the first means for setting to a prescribed forwarding destination;
   a means for setting whether or not to carry out forwarding to the prescribed forwarding destination when the image data is not transmitted by the first means for transmitting; and
   a means for printing the received image data when the image data is not transmitted by the first means for transmitting and the second means for transmitting.

2. The facsimile machine according to claim 1 further comprising:
   a second means for setting a time range when the second means for transmitting should transmit the image data to the prescribed forwarding destination;
   means for indicating a time when the means for receiving received the image data; and
   a means for determining whether or not the time indicated by the means for indicating is within the time range set by the second means for setting,
   wherein the second means for transmitting transmits the image data to the prescribed forwarding destination when the means for determining determines that the time is within the time range.

3. The facsimile machine according to claim 2 further comprising means for printing the image data on a recording paper when the means for determining determines that the time is not within the time range.

4. A facsimile machine comprising:
- a means for receiving reception information along with image data;
- a first means for setting a forwarding destination of the image data in accordance with the reception information,
- wherein the first means for setting sets a forwarding destination when the received reception information corresponds to a condition table;
- a means for determining whether or not the forwarding destination of the image data received by the means for receiving is set by the first means for setting;
- a first means for transmitting the image data to the forwarding destination when it is determined that the forwarding destination is set by the first means for setting;
- a second means provided within the facsimile machine for transmitting the image data to a prescribed forwarding destination that is independent from the forwarding destination set by the first means for setting when it is determined that the forwarding destination is not set by the first means for setting;
- a means for setting whether or not to carry out forwarding to the prescribed forwarding destination when the image data is not transmitted by the first means for transmitting; and
- a means for printing the received image data when the image data is not transmitted by the first means for transmitting and the second means for transmitting.

5. The facsimile machine according to claim 4, wherein the means for receiving receives the image data by a facsimile procedure via a telephone line, and the means for determining obtains the reception information from a facsimile procedure signal.

6. The facsimile machine according to claim 4, wherein the means for receiving receives the image data attached to an electronic mail by an electronic mail procedure via an IP (Internet protocol) network, and the means for determining obtains the reception information from electronic mail header information.

7. The facsimile machine according to claim 4, wherein the means for receiving receives the image data attached to an electronic mail by an electronic mail procedure via an IP (Internet protocol) network, and the means for determining obtains the reception information from electronic mail procedure information.

8. The facsimile machine according to claim 4 further comprising:
- a second means for setting a time range when the second means for transmitting means should transmit the image data to the prescribed forwarding destination;
- means for indicating a time when the means for receiving received the image data; and
- a second means for determining whether or not the time indicated by the means for indicating is within the time range set by the second means for setting,
- wherein when the second means for determining determines that the time is within the time range, the second means for transmitting transmits the image data to the prescribed forwarding destination.

9. The facsimile machine according to claim 8 further comprising a means for printing the image data on a recording paper when the second means for determining determines that the time is not within the time range.

10. The facsimile machine according to claim 8, wherein the means for receiving receives the image data by a facsimile procedure via a telephone line, and the means for determining obtains the reception information from a facsimile procedure signal.

11. The facsimile machine according to claim 8, wherein the means for receiving receives an image data attached to an electronic mail by an electronic mail procedure via an IP (Internet protocol) network, and the means for determining obtains the reception information from electronic mail header information.

12. The facsimile machine according to claim 8, wherein the means for receiving receives an image data attached to an electronic mail by an electronic mail procedure via an IP (Internet protocol) network, and the means for determining obtains the reception information from electronic mail procedure information.

13. A method for controlling a facsimile machine comprising:
- receiving reception information along with image data;
- setting a forwarding destination of the image data when the received reception information corresponds to a condition table;
- transmitting the image data to the forwarding destination when it is determined that the received reception information corresponds to a condition table;
- setting whether or not to carry out forwarding to a prescribed forwarding destination that is independent from the set forwarding destination when the image data is not transmitted to the forwarding destination;
- transmitting the image data by the facsimile machine to the prescribed forwarding destination that is independent from the set forwarding destination when it is determined that the received reception information does not correspond to a condition table; and
- printing the received image data when the image data is not transmitted to the forwarding destination and the prescribed forwarding destination.

14. The method for controlling a facsimile machine according to claim 13 further comprising:
- setting a time range when the image data should be transmitted to the prescribed forwarding destination;
- clocking a time when the image data is received;
- determining whether or not the clocked time is within the set time range; and
- transmitting the image data to the prescribed forwarding destination when it is determined that the clocked time is within the set time range.

15. The method for controlling a facsimile machine according to claim 14 further comprising printing the image data on a recording paper when it is determined that the clocked time is not within the set time range.

16. The method for controlling a facsimile machine according to claim 13, further comprising:
- carrying out the reception of the image data by a facsimile procedure via a telephone line; and obtaining reception information from the facsimile procedure signal.

17. The method for controlling a facsimile machine according to claim 13, further comprising:
- carrying out the reception of the image data by receiving the image data attached to an electronic mail by an electronic mail procedure via an IP (Internet protocol) network; and
- obtaining the reception information from electronic mail header information.

18. The method for controlling a facsimile machine according to claim 13, further comprising:

carrying out the reception of the image data by receiving the image data attached to an electronic mail by an electronic mail procedure via an IP (Internet protocol) network; and obtaining the reception information from electronic mail procedure information.

19. A facsimile machine comprising:

means for receiving reception information along with image data;

a first means for setting a forwarding destination to some of the image data in accordance with the reception information, wherein the first means for setting sets a forwarding destination when the received reception information corresponds to a condition table;

a second means for setting a forwarding destination independent of the first means for setting;

a means for determining whether or not the forwarding destination is set by the first means for setting;

a first means for transmitting the image data to the forwarding destination when the means for determining determines that the forwarding destination is set by the first means for setting;

a second means provided within the facsimile machine for transmitting the image data to the forwarding destination set by the second means for setting when the means for determining determines that the forwarding destination has not been set by the first means for setting;

a means for setting whether or not to carry out forwarding to the forwarding destination set by the second means for setting when the image data is not transmitted by the first means for transmitting; and a means for printing the received image data when the image data is not transmitted by the first means for transmitting and the second means for transmitting.

20. The facsimile machine according to claim 19, wherein the second means for transmitting prints the image data received by the means for receiving when the forwarding destination corresponding to each of the image data is not set by the second means for setting.

21. A facsimile machine comprising:

a receiver receiving image data and reception information;

a first setting device setting a forwarding destination to some of the image data received by the receiver, wherein the first setting device sets a forwarding destination when the received reception information corresponds to a condition table;

a first transmitter transmitting the image to the forwarding destination set by the first setting device;

a second transmitter provided within the facsimile machine transmitting the image data not set with the forwarding destination by the first setting device to a prescribed forwarding destination;

a setting device setting whether or not to carry out forwarding to the prescribed forwarding destination when the image data is not transmitted by the first transmitter; and a printer printing the received image data when the image data is not transmitted by the first transmitter and the second transmitter.

* * * * *